(12) United States Patent
Deguchi et al.

(10) Patent No.: US 7,457,637 B2
(45) Date of Patent: Nov. 25, 2008

(54) NONCONTACT RECORDING MEDIUM READER/WRITER

(75) Inventors: Futoshi Deguchi, Fukuoka (JP); Hiroshi Yoshinaga, Kasuya-gun (JP); Masahiko Tanaka, Fukuoka (JP); Hiroaki Haruyama, Fukuoka (JP); Takashi Yamaguchi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 494 days.

(21) Appl. No.: 10/878,393

(22) Filed: Jun. 29, 2004

(65) Prior Publication Data

US 2004/0266486 A1    Dec. 30, 2004

(30) Foreign Application Priority Data

Jun. 30, 2003    (JP)    ............... 2003-186825

(51) Int. Cl.
*H04M 1/00*    (2006.01)
(52) U.S. Cl. ............ 455/562.1; 455/551; 455/575.7; 343/908; 235/493
(58) Field of Classification Search ............. 455/550.1, 455/551, 562.1, 575.1, 575.7; 235/435, 439, 235/492, 493; 343/907, 908
See application file for complete search history.

(56) References Cited

U.S. PATENT DOCUMENTS

| | | | | |
|---|---|---|---|---|
| 4,621,190 A * | 11/1986 | Saito et al. | .................. | 235/492 |
| 5,208,706 A * | 5/1993 | Lemelson | ....................... | 360/2 |
| 6,412,702 B1 * | 7/2002 | Ishikawa et al. | ............ | 235/492 |
| 6,517,005 B1 * | 2/2003 | Ayala | ......................... | 235/492 |
| 6,608,550 B2 * | 8/2003 | Hayashi et al. | .......... | 340/10.34 |
| 6,809,952 B2 * | 10/2004 | Masui | ........................ | 365/145 |
| 2001/0007335 A1 * | 7/2001 | Tuttle et al. | .................. | 235/492 |
| 2001/0030238 A1 * | 10/2001 | Arisawa | ...................... | 235/492 |
| 2002/0096568 A1 * | 7/2002 | Arisawa | ...................... | 235/492 |
| 2004/0044956 A1 * | 3/2004 | Huang | ......................... | 715/511 |

(Continued)

FOREIGN PATENT DOCUMENTS

EP    1439608    7/2004

(Continued)

OTHER PUBLICATIONS

European Search Report dated Jun. 1, 2006.

(Continued)

*Primary Examiner*—Edward Urban
*Assistant Examiner*—Nhan T. Le
(74) *Attorney, Agent, or Firm*—Dickinson Wright, PLLC

(57) ABSTRACT

The object of the invention is to provide a noncontact IC card reader/writer integrated with an antenna that does not require the limitation of an installation location and the adjustment of a resonance frequency of the antenna, is convenient in installation, is provided with a stable characteristic, is small-sized and low-priced. To achieve the object, the invention is provided with a loop antenna that supplies electric power and send data to a noncontact IC card by electromagnetic induction and acquires receive data from the noncontact IC card by load fluctuation, a magnetic body arranged closely at the back of the loop antenna, a first metallic plate arranged on the back side of the magnetic body and a second metallic plate arranged on the back side of the first metallic plate and larger than the first metallic plate in size.

28 Claims, 7 Drawing Sheets

U.S. PATENT DOCUMENTS

2004/0075616 A1   4/2004   Endo et al.

FOREIGN PATENT DOCUMENTS

| JP | 08263610 | 10/1996 |
|---|---|---|
| JP | 09284038 | 10/1997 |
| JP | 11238103 | 8/1999 |
| JP | 11353561 | 12/1999 |
| JP | 2001-502832 | 2/2001 |
| JP | 2002050922 | 2/2002 |
| JP | 2002298095 | 10/2002 |
| JP | 2003141466 | 5/2003 |
| WO | 03030300 | 4/2003 |

OTHER PUBLICATIONS

English translation of Japanese Office Action of Jun. 19, 2007.
English translation of JP 8263610.
English translation of JP 11238103.
Japanese Office Action of Jun. 19, 2007.
Japanese Office Action dated Jan. 18, 2008 with English Translation thereof.

* cited by examiner

Fig. 2
(a)
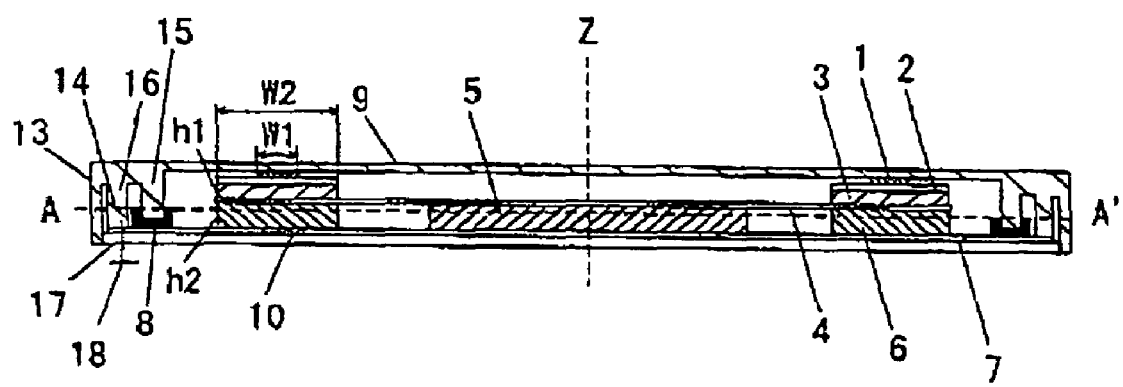
(b)
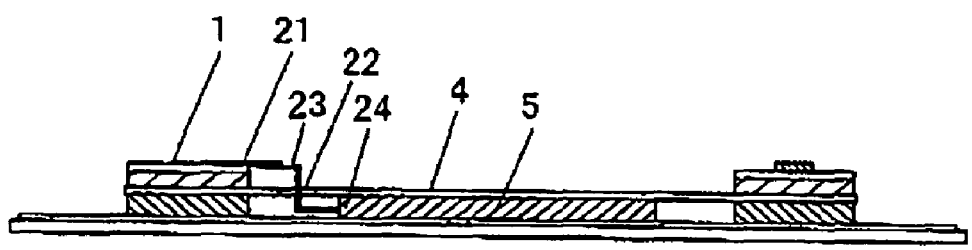

Fig. 7
(a)
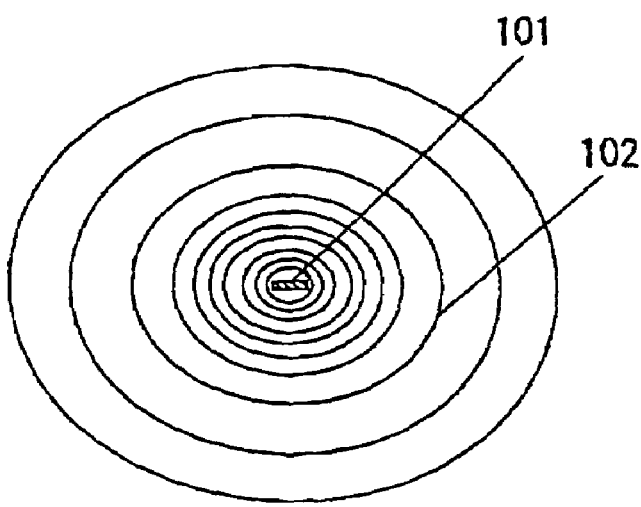
(b)
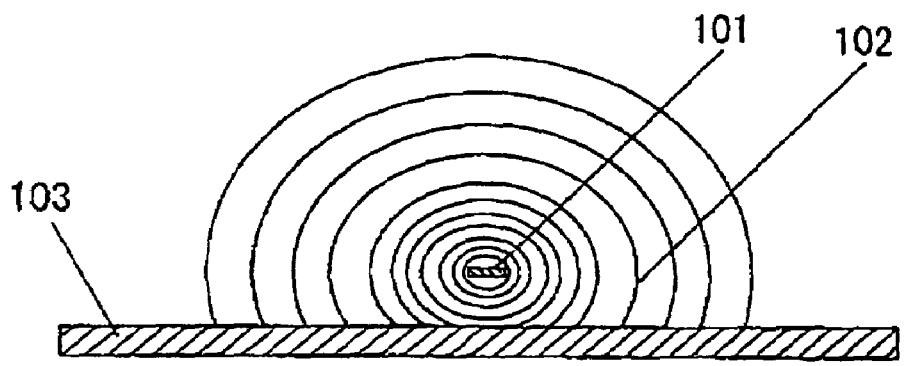
(c)
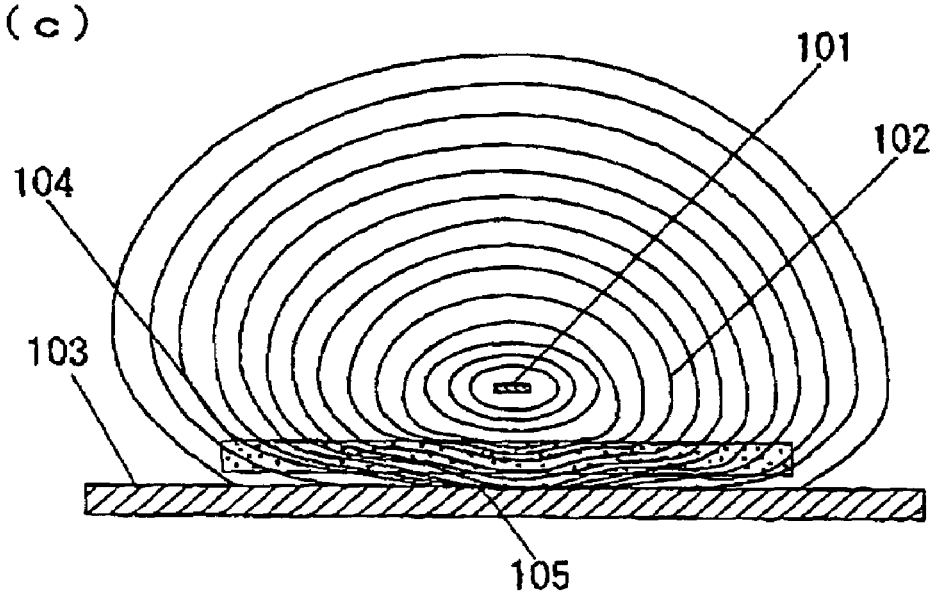

NONCONTACT RECORDING MEDIUM READER/WRITER

CROSS REFERENCE TO RELATED APPLICATION

This application is based upon and claims the benefit of priority of Japanese Patent Application No 2003-186825 filed on Mar. 6, 1930, the content of which are incorporated herein by references in its entirety.

BACKGROUND OF THE INVENTION

1. Field of the Invention

The present invention relates to a noncontact IC card reader/writer that supplies electric power and send data to a noncontact IC card and acquires receive data from the noncontact IC card by load fluctuation, particularly relates to a noncontact IC card reader/writer integrated with an antenna that reduces the effect of metal and others around an installation location and meets a stable reading characteristic and a stable writing characteristic.

2. Description of the Related Art

Heretofore, a reader/writer system using an IC card has been generally called a noncontact IC card system and is being practically utilized for a physical distribution system, a transportation system, an air cargo management system and others respectively utilizing a frequency band of 13.56 MHz for example. This system is provided with an IC card having an IC chip and an antenna coil on one card made of resin and a reader/writer that communicates with the IC card, and the reader/writer is provided with a loop antenna. Electric power and send data are constantly or intermittently transmitted via the loop antenna and receive data from the IC card located in a range in which the electric power and the send data can be received is acquired.

In case the antenna of the conventional type reader/writer is used near to metal, problems that a generated magnetic field is weakened by the effect of the metal, sufficient power supply to the IC card is disabled, communication distance is reduced and communication is disabled are caused. For a countermeasure, devices that a magnetic body such as a ferrite core is attached under the antenna, a magnetic circuit in which a magnetic flux easily wraps the front of the antenna coil is provided and the effect of metal at the back of the antenna is reduced are required.

FIG. 6 is a conceptual drawing showing a conventional type noncontact IC card reader/writer disclosed in JP-A-2002-298095 for example. As shown in FIG. 6, the noncontact IC card reader/writer 100 uses a flexible magnetic sheet 104 under an antenna 101.

FIG. 7 are explanatory drawings showing relation between whether a metallic obstacle exists in the vicinity of the antenna of the conventional type noncontact IC card reader/writer or not and a flow of a magnetic flux. As shown in FIG. 7, a reference number 101 denotes the antenna, 102 and 105 denote a magnetic flux, 103 denotes a metallic plate, and 104 denotes the magnetic sheet.

FIG. 7A shows a flow of the magnetic flux 102 around the antenna 101 and shows a state that no obstacle such as metal exists in the vicinity of the antenna 101. In this case, it is known that the magnetic flux 102 concentrically spreads with the antenna 101 in the center and magnetic density is high in the vicinity of the antenna 101.

FIG. 7B shows a flow of the magnetic flux 102 in case the metallic plate 103 exists in the vicinity of the antenna 101, when the magnetic flux 102 reaches the metallic plate 103, its magnetic field goes through the metallic plate 103, at this time, eddy current (not shown) is caused on the metallic plate 103 according to Ampere's right-handed screw rule, a magnetic flux in a reverse direction is caused at the back of the metallic plate 103 by the eddy current, acts in a direction in which the original magnetic flux is negated, and it seems that the magnetic field were disconnected by the metallic plate 103. Further, heat loss because eddy current flows on the metallic plate 103 is caused. Besides, when viewed from the antenna 101, the closer distance between the antenna and the metallic plate 103 is, the lower impedance is, the state is close to a short-circuited state, and the impedance of the antenna is extremely low.

It is a noncontact IC card reader/writer shown in FIG. 6 and disclosed in the patent document 1 that applies a magnetic circuit to avoid this phenomenon.

However, the conventional type noncontact IC card reader/writer has the following problems.

That is, in the case of the noncontact IC card reader/writer disclosed in the patent document 1, as shown in FIG. 6, the magnetic sheet 104 is merely arranged under the antenna 101 and only the magnetic sheet 104 which is a magnetic circuit is arranged between the antenna 101 and the metallic plate 103 as shown in FIG. 7C.

According to this structure, the magnetic flux 102 advances in a direction of the length in the magnetic sheet 104 to form a closed circuit, however, a magnetic flux 105 of a part passes the magnetic sheet 104, and emerges on the back side of the metallic plate 103. Particularly, an amount of passage immediately under the antenna 101 where magnetic fluxes concentrate is much, and the farther distance from the antenna 101 is, the more non-dense the magnetic fluxes are.

Therefore, the magnetic flux 105 that passes the magnetic sheet 104 reaches the metallic plate 103, loss by eddy current is caused on the large metallic plate 103 as described above, and the impedance of the antenna 101 is deteriorated.

In case the conventional type noncontact IC card reader/writer is directly installed on the metallic plate 103, the impedance of the antenna 101 is greatly influenced by the metallic plate 103 and varies because the magnetic flux 105 that passes the magnetic sheet 104 leaks, a resonance frequency fluctuates, the input/output impedance of the reader/writer and the impedance are not matched, and sufficient power supply from the antenna 101 to a noncontact IC card is disabled. As a result, problems that communication distance is reduced, communication is disabled and in the worst case, a transmitting circuit of the reader/writer is broken may occur.

Further, there is a problem that in case communication distance is extended, the size of the antenna 101 is required to be increased, naturally the size of the magnetic sheet 104 is also required to be increased, and a rate for which the price of the expensive magnetic sheet 104 accounts in the price of the whole reader/writer also greatly increases.

SUMMARY OF THE INVENTION

Then, the invention is made to solve the above-mentioned problems and the object is to provide a noncontact IC card reader/writer integrated with an antenna that does not require the limitation of an installation location and the adjustment of a resonance frequency of the antenna, is convenient in installation, is provided with a stable characteristic, is small-sized and low-priced.

The invention is provided with a loop antenna that supplies electric power and send data to a noncontact IC card by electromagnetic induction and acquires receive data from the noncontact IC card by load fluctuation, a magnetic body arranged closely at the back of the loop antenna, a first metallic plate arranged on the back side of the magnetic body and a second metallic plate arranged on the back side of the first metallic plate and larger than the first metallic plate in size.

BRIEF DESCRIPTION OF THE DRAWINGS

FIG. 2A is a sectional view viewed along a line A-A' shown in FIG. 1 and FIG. 2B is a sectional view viewed along a line B-B' shown in FIG. 1;

FIG. 7 are explanatory drawings showing relation between whether a metallic obstacle exists in the vicinity of an antenna of the conventional type noncontact IC card reader/writer or not and the flow of a magnetic flux.

DETAILED DESCRIPTION OF THE PREFERRED EMBODIMENTS

Figure 1:
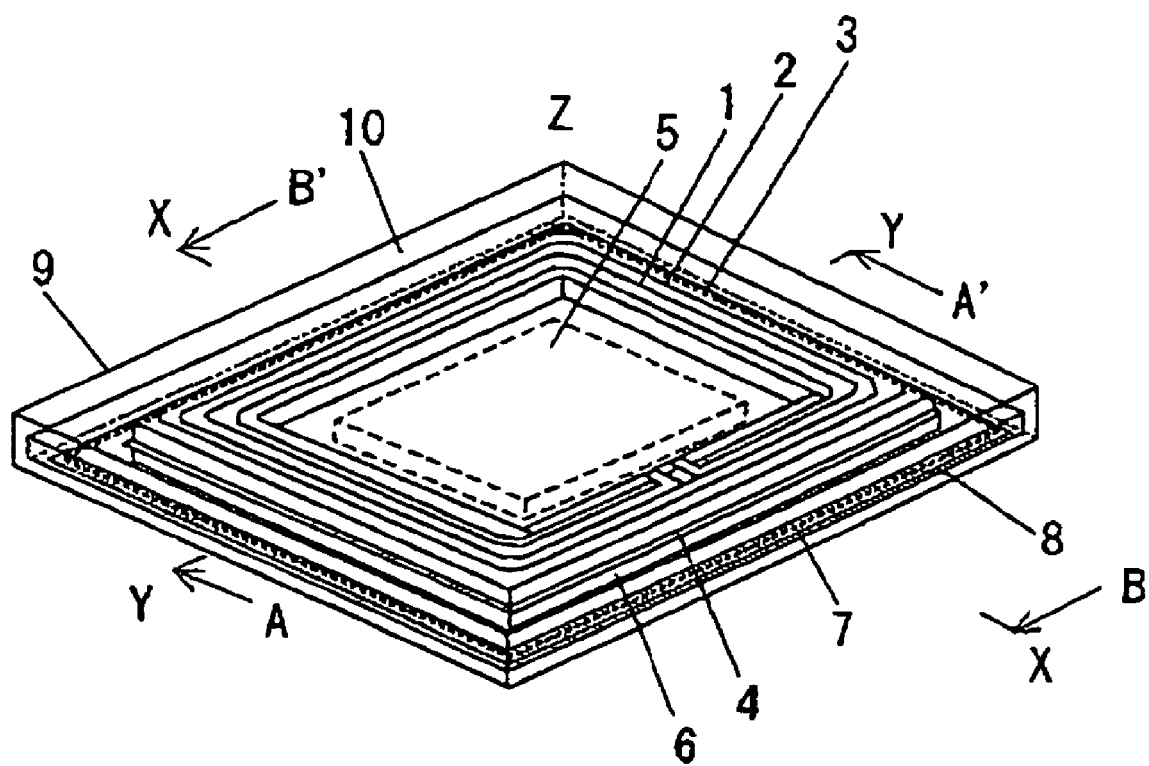
FIG. 1 is a perspective view showing a noncontact IC card reader/writer integrated with an antenna equivalent to a first embodiment of the invention.

The invention disclosed in a first aspect is characterized in that the variation of impedance of an antenna and the displacement of a resonance frequency are never caused by the effect of metal around an installation location and the adjustment of the resonance frequency is not required respectively by providing the loop antenna that supplies electric power and send data to a noncontact IC card by electromagnetic induction and acquires receive data from the noncontact IC card by load fluctuation, a magnetic body arranged closely at the back of the loop antenna, a first metallic plate arranged on the back side of the magnetic body and a second metallic plate arranged on the back side of the first metallic plate and larger than the first metallic plate in size.

The invention disclosed in a second aspect is characterized in that the magnetic body is a loop and provides a low-priced reader/writer that reduces the used amount of an expensive magnetic sheet, holding performance that the reader/writer is hardly influenced by metal around its installation location.

The invention disclosed in a third aspect is characterized in that the width W2 of the magnetic body is substantially equal to or equivalent to the double or 3 to 5 times of the diameter or the width W1 of the loop antenna and provides a low-priced reader/writer that reduces the used amount of an expensive magnetic sheet, holding performance that the reader/writer is hardly influenced by metal around its installation location.

The invention disclosed in a fourth aspect is characterized in that the outside dimension of the magnetic body and the outside dimension of the first metallic plate are substantially equalized and realizes the miniaturization of a reader/writer, holding performance that the reader/writer is hardly influenced by metal around its installation location.

The invention disclosed in a fifth aspect is characterized in that the size of the second metallic plate is equal to or exceeds at least 1.1 times of the size of the first metallic plate, the size can be minimized, holding these performance and a reader/writer can be miniaturized.

The invention disclosed in a sixth aspect is characterized in that a first spacer made of insulating material is provided between the magnetic body and the first metallic plate and the effect of metal around an installation location is more reduced by adjusting the impedance of the antenna in a state in which the first metallic plate exists.

The invention disclosed in a seventh aspect is characterized in that the first spacer is arranged in the shape of a loop and its supporting strength can be maintained, meeting its function.

The invention disclosed in an eighth aspect is characterized in that the first spacer is made of resin, the first spacer can be easily formed and can be lightened.

The invention disclosed in a ninth aspect is characterized in that a second spacer made of insulating material is provided between the first metallic plate and the second metallic plate and the effect of metal around an installation location is more reduced by adjusting the impedance of the antenna in a state in which the second metallic plate exists.

The invention disclosed in a tenth aspect is characterized in that the second spacer is arranged in the shape of a loop and its supporting strength can be maintained, meeting its function.

The invention disclosed in an eleventh aspect is characterized in that the second spacer is made of resin, the second spacer can be easily formed and can be lightened.

The invention disclosed in a twelfth aspect is characterized in that the second spacer made of insulating material is provided between the first metallic plate and the second metallic plate and a noncontact IC card reading/writing circuit is housed in a spatial part inside the second spacer, the effect of an electromagnetic field upon the noncontact IC card reading/writing circuit from the antenna itself is reduced by shielding effect by holding between the two metallic plates, and further, the miniaturization of the whole reader/writer and the integration of the antenna are also realized.

The invention disclosed in a thirteenth aspect is characterized in that a side wall planted on the back side is provided to the periphery of the first metallic plate, mechanical strength is increased, and shielding effect upon the IC card reading/writing circuit is increased.

The invention disclosed in a fourteenth aspect is characterized in that a side wall planted on the front side is provided to the periphery of the second metallic plate, the surface area of the second metallic plate is increased, the case is equivalent to a case that a larger metallic plate is arranged, and an effect in case a reader/writer is installed on a large metallic plate can be also more reduced by matching the antenna in this state.

The invention disclosed in a fifteenth aspect is characterized in that the loop antenna, the magnetic body, the first metallic plate and the second metallic plate respectively according to any of the first to fourteenth aspects are arranged in a case composed of a first case made of resin and a second case made of resin, the assembly in manufacture is more simplified, and the dispersion of performance is reduced by the enhancement of the positioning/assembly dimensional precision of each component.

The invention disclosed in a sixteenth aspect is characterized in that a first convex portion is provided inside the side wall of the first case made of resin, a concave sealing member that wraps the convex portion is provided, a second convex portion is provided between the side wall and the first convex portion and waterproof structure is acquired by inserting a screw into a fitting part provided to the second convex portion via a hole provided outside the first convex portion and screwing on the second metallic plate, sealing performance in the case is enhanced, and waterproof effect is enhanced.

The invention disclosed in a seventeenth aspect is characterized in that the loop antenna and the noncontact IC card reading/writing circuit are electrically connected via an opening formed through the first metallic plate, and the connection is facilitated.

The invention disclosed in an eighteenth aspect is characterized in that metallic wire or a metallic plate is used for the connection, the assembly in manufacture is more simplified, compared with feeding via a coaxial cable and others, the price is fallen, and the dispersion of performance is reduced.

As described above, according to the invention, the noncontact IC card reader/writer integrated with the antenna an installation location of which is not limited, which is not influenced by metal particularly, which does not require the adjustment of a resonance frequency and the impedance of the antenna, which is convenient in installation, is small-sized and low-priced can be provided.

Referring to FIGS. 1 to 5, embodiments of the invention will be described below. The noncontact IC card in the invention is not limited to a so-called card but is a radio communication medium that can communicate with the reader/writer without contact. Therefore, the noncontact IC card according to the invention includes cards called an IC tag, an ID tag and an identification label depending upon application.

(First Embodiment)

FIG. 1 is a perspective view showing a noncontact IC card reader/writer integrated with an antenna equivalent to a first embodiment of the invention, FIG. 2 are sectional views showing it, FIG. 2A is the sectional view viewed along a line A-A' in FIG. 1, and FIG. 2B is the sectional view viewed along a line B-B' in FIG. 1.

As shown in FIGS. 1 and 2, a reference number 1 denotes a loop antenna and 2 denotes a magnetic body forming a magnetic circuit. A reference number 3 denotes a first spacer, 4 denotes a first metallic plate, the thickness of the first spacer 3 is set to a desired dimension h1, and the first spacer fills the role of keeping distance between the first metallic plate 4 and the magnetic body 2 holding the loop antenna 1 fixed. Further, a reference number 5 denotes a noncontact IC card reading/writing circuit. A reference number 6 denotes a second spacer, 7 denotes a second metallic plate, the thickness of the second spacer 6 is set to a desired dimension h2, and the second spacer fills the role of keeping distance between the first metallic plate 4 and the second metallic plate 7 fixed. Further, a reference number 8 denotes a sealing member, 9 denotes a first case made of resin and 10 denotes a second case made of resin.

The back or the back side of each component in the invention denotes the downside in FIG. 2A and the front side denotes the upside in FIG. 2A.

The loop antenna 1 has only to be a loop provided with an opening in the center and the form may be a circular, substantially rectangular or polygonal. Further, the loop antenna 1 may be made of conductive metallic wire, a metallic plate, metallic foil or a metallic cylinder.

The magnetic body 2 is arranged closely on the back face of the loop antenna 1 and holds the loop antenna 1. For the material, a sheet or a plate is used. For the sheet or the plate, a ferrite core and others can be also used, however, the magnetic body can be lightened by using a magnetic sheet acquired by mixing soft magnetic powder in an organic combination such as resin material for example and it is desirable. The form may be also arranged overall including an area equivalent to the opening of the loop antenna 1, however, the amount of the used magnetic body can be reduced by looping the magnetic body (in the shape of a donut) so that the form is coincident with the form of the loop antenna 1. This is particularly desirable in case an expensive magnetic sheet is used.

Further, it is desirable that the width W2 of the magnetic body 2 is substantially equal to or equivalent to the double or 3 to 5 times of the diameter or the width W1 of the loop antenna 1. The amount of the used expensive magnetic sheet can be reduced by keeping the width of the magnetic body in this range, holding performance that the reader/writer is hardly influenced by metal around an installation location.

The first spacer 3 keeps distance between the first metallic plate 4 and the magnetic body 2 holding the loop antenna 1 fixed by setting the thickness of the first spacer to a desired dimension h1. The first spacer 3 is made of insulating material and it is desirable that it is made of resin. The spacer made of resin can be easily formed and can be lightened. The first spacer 3 can also function as an adhesive of the magnetic body 2 and the first metallic plate 4 by using thermosetting resin and photo-curing resin for the first spacer. The first spacer may be also arranged overall including an area equivalent to an opening of the magnetic body 2 in case the magnetic body is a loop and may be also a loop (in the shape of a donut) so that the form is equivalent to the form of the magnetic body 2. The supporting strength can be maintained by looping the first spacer 3, meeting a function and it is desirable. Further, the first spacer may be also arranged overall without clearance between the magnetic body 2 and the first metallic plate 4 and may be also arranged partially.

For the first metallic plate 4, a flat plate made of metal such as aluminum (Al) and iron (Fe) can be used. The size of the first metallic plate can be minimized by equalizing the form of the first metallic plate 4 to the peripheral form of the magnetic body 2 (however, the center is closed), that is, by substantially equalizing the outside dimension (the maximum dimension) of both, holding performance that the reader/writer is hardly influenced by metal around the installation location, and the reader/writer can be miniaturized.

The noncontact IC card reading/writing circuit 5 is the noncontact IC card reader/writer, and though the detailed circuit configuration is omitted in FIGS. 1 and 2, an oscillation circuit, a power amplifier, a current detection circuit, a control circuit, an antenna adjusting circuit, a transmitter and a receiver for example are mounted on a printed board, supply electric power and send data to the noncontact IC card via the loop antenna 1 and communicate with the noncontact IC card.

The thickness of the second spacer 6 is set to a desired dimension h2 and the second spacer keeps distance between the first metallic plate 4 and the second metallic plate 7 fixed. The second spacer 6 is made of insulating material like the first spacer 3 and it is desirable that it is made of resin. The spacer made of resin can be easily formed and can be lightened. The second spacer can also function as an adhesive of the first metallic plate 4 and the second metallic plate 7 by using thermosetting resin and photo-curing resin. The second spacer 6 is arranged to form space inside so as to arrange the noncontact IC card reading/writing circuit 5. The second spacer has only to be a loop (in the shape of a donut) and as the supporting strength can be maintained by arranging the spacer in such a form, meeting a function, it is desirable. Further, the second spacer may also arranged overall without clearance in a state in which the second spacer encircles the noncontact IC card reading/writing circuit 5 and may be also arranged partially.

For the second metallic plate 7, a flat plate made of metal such as aluminum (Al) and iron (Fe) can be used. It is desirable that the second metallic plate is larger than the first metallic plate 4. Further, if only the second metallic plate 7 is of size (area) substantially equal to or exceeding 1.1 times of the first metallic plate 4, the fluctuation of impedance of the antenna and the displacement of a resonance frequency are never caused by the effect of metal around an installation location, and the adjustment of the resonance frequency is not required. Therefore, in case the size of the second metallic plate 7 is at least approximately 1.1 times of the size of the first metallic plate 4, it can be minimized, holding these performance and the reader/writer can be miniaturized.

Each component described above is arranged in the case composed of the first resin case 9 and the second resin case 10. For the sealing member 8, waterproof packing made of synthetic rubber is used.

The assembly and the case of the noncontact IC card reader/writer integrated with the antenna equivalent to the first embodiment of the invention will be described below.

As shown in FIG. 2A, the assembly in manufacture is more simplified by configuring so that the loop antenna 1, the magnetic body 2, the first spacer 3, the first metallic plate 4, the second spacer 6 and the second metallic plate 7 are held between the first resin case 9 and the second resin case 10, and the dispersion of performance can be reduced by the enhancement in positioning/assembly dimensional precision of each component.

Further, a first convex portion 15 is provided inside the sidewall 13 of the first resin case 9, the concave sealing member 8 is provided in the form that the concave sealing member wraps the convex portion 15, a second convex portion 16 is provided between the side wall and the first convex portion 15, and waterproof structure is acquired by inserting a screw 18 into a fitting part 14 (for example, an insert nut) provided to the second convex portion 16 via a hole 17 made outside the first convex portion 15 and screwing on the second metallic plate 7.

Further, as shown in FIG. 2B, an opening (a through hole) 22 in desired size is provided to a desired position of the first metallic plate 4 for feeding between a feeding terminal 21 of the loop antenna 1 and an I/O terminal 24 of the noncontact IC card reading/writing circuit 5 mounted on the printed board, the assembly in manufacture is more simplified by connecting the terminals via the opening (through hole) 22 by a connecting member 23 made of metallic wire and a metallic plate for example and feeding, compared with feeding via a coaxial cable, the price can be fallen, and the dispersion of performance can be reduced.

Next, the antenna of the noncontact IC card reader/writer integrated with the antenna equivalent to the first embodiment of the invention will be described in detail including the flow of a magnetic flux.

As shown in FIGS. 1 and 2, the fluctuation of impedance of the antenna and the displacement of the resonance frequency are never caused by the effect of metal and others around the installation location and the adjustment of the resonance frequency is not required respectively by arranging the magnetic body 2 made of a sheet or a plate in the form of a circular, a substantially rectangular or a polygonal loop closely under the loop antenna 1, arranging the first metallic plate 4 the substantially maximum dimension of which is the substantially same as the maximum dimension of the magnetic body 2 in a desired position on the downside of the magnetic body 2 and arranging the second metallic plate 7 the substantially maximum dimension of which is substantially equal to or exceeds 1.1 times of the size of the first metallic plate 4 in a desired position on the downside of the first metallic plate 4.

Figure 3:
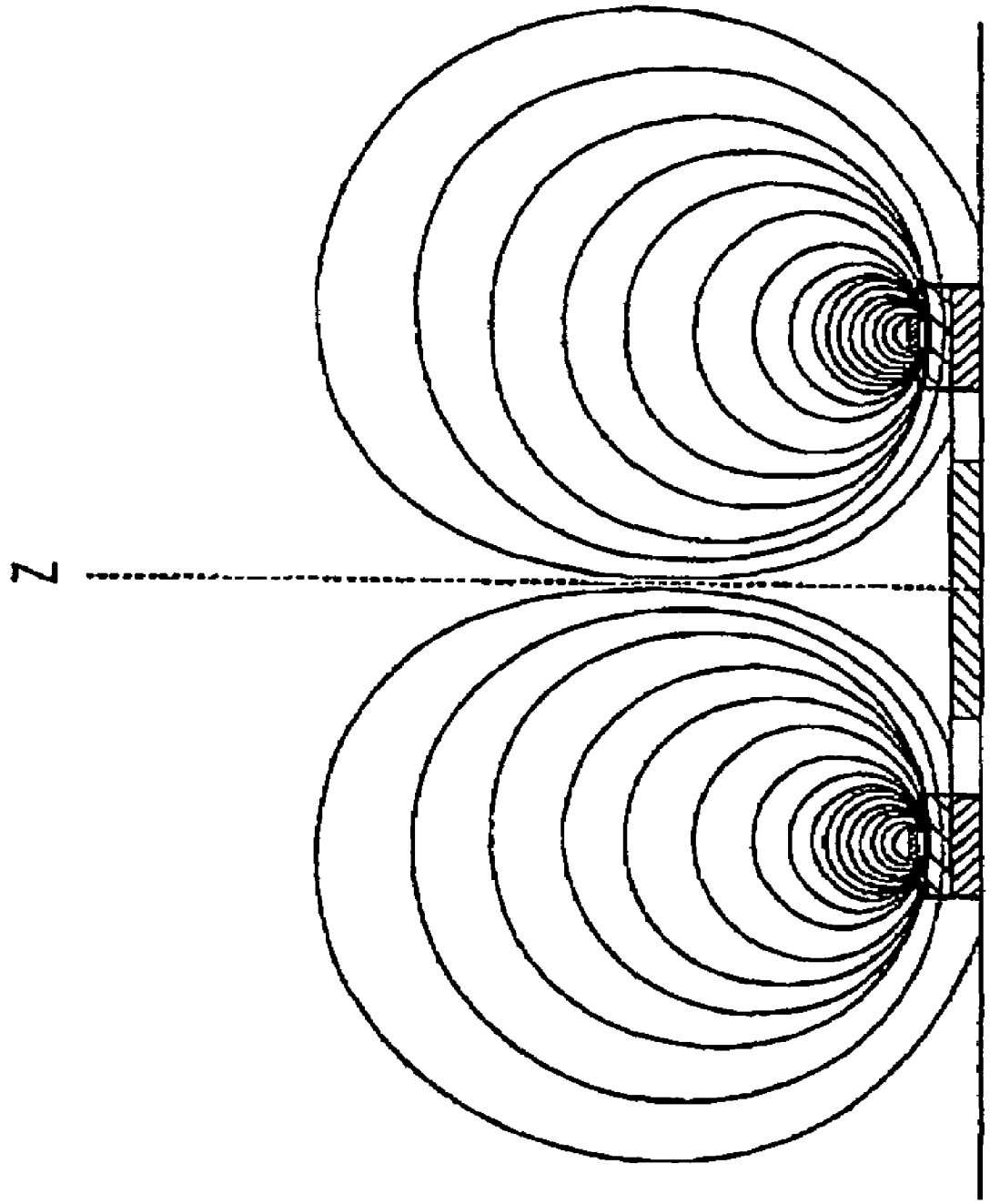
FIG. 3 is an operational explanatory drawing showing the flow of a magnetic flux of the noncontact IC card reader/writer integrated with the antenna equivalent to the first embodiment of the invention.

FIG. 3 is an operational explanatory drawing showing the flow of a magnetic flux in the noncontact IC card reader/writer integrated with the antenna equivalent to the first embodiment of the invention. As shown in FIG. 3, a magnetic flux efficiently reaches the front side (the upside in FIG. 3) of the antenna of the noncontact IC card reader/writer integrated with the antenna.

Next, a case that the noncontact IC card reader/writer integrated with the antenna is installed on a large metallic plate 12 will be described.

Figure 4:
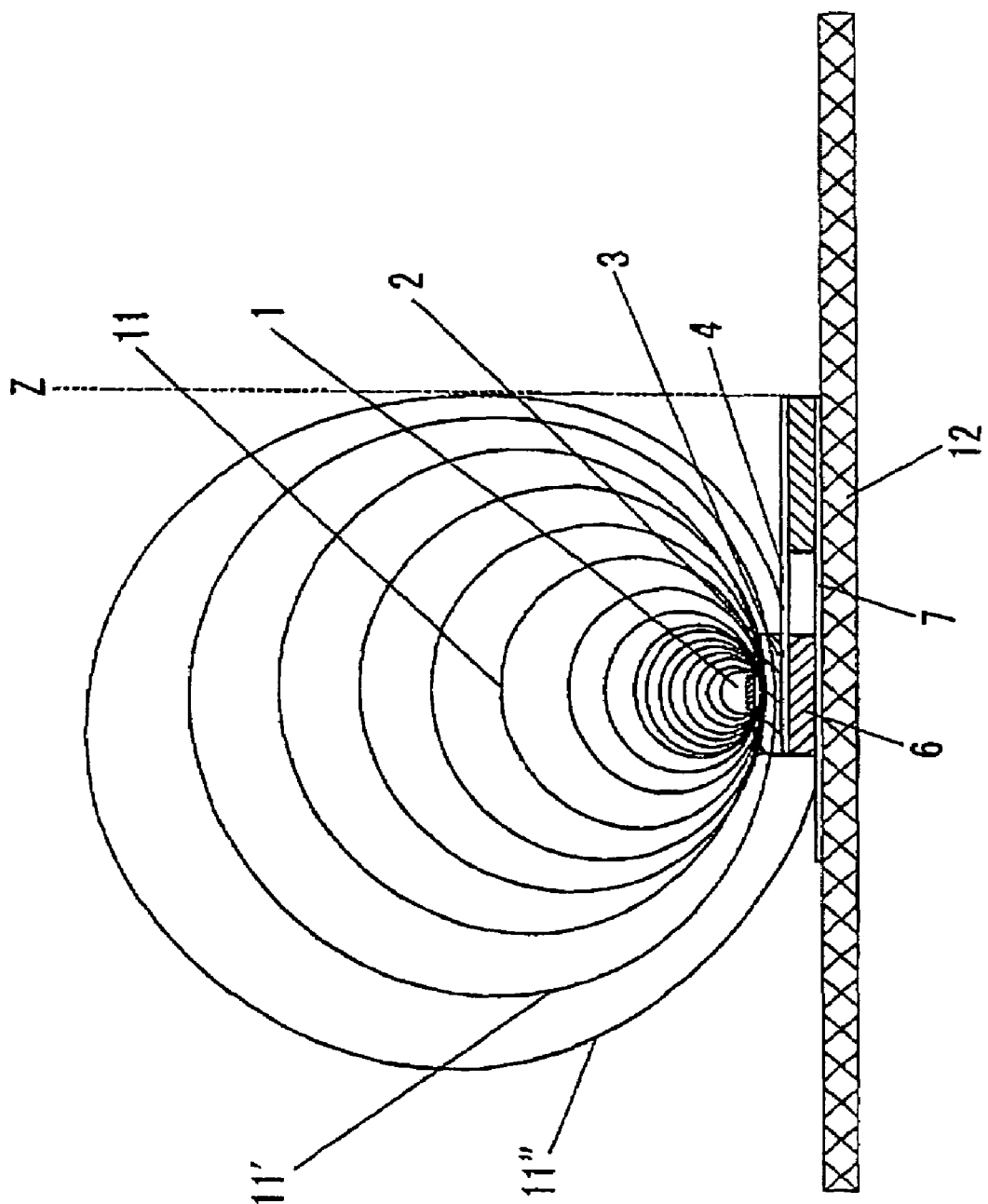
FIG. 4 is an operational explanatory drawing showing a part on the left side of a center line Z in FIG. 3 in an enlarged state.

FIG. 4 is an operational explanatory drawing showing a part on the left side of a center line Z in FIG. 3 in an enlarged state and explains the operation in case the noncontact IC card reader/writer integrated with the antenna is installed on the large metallic plate 12. In FIG. 4, as a half on the right side of the center line Z of the noncontact IC card reader/writer integrated with the antenna shown in FIG. 3 is symmetrical based upon the center line, the half is omitted.

As shown in FIG. 4, a part dense in magnetic flux density concentrates at the magnetic body 2 under the loop antenna 1 by arranging the magnetic body 2 under the loop antenna 1 and a loop (a closed circuit) of a magnetic flux can be efficiently made. Further, a magnetic flux 11 can pass the spacer by providing the first spacer 3 made of resin between the magnetic body 2 and the first metallic plate 4 and efficiently reaches the front side (the upside in FIG. 4) of the loop antenna 1.

Further, as the effect of the first spacer 3 made of resin, as the magnetic flux passes the metallic plate in a location in which magnetic flux density is non-dense without being touched to the metallic plate in a location in which magnetic flux density is dense as in the above-mentioned conventional type example, the generation of eddy current is reduced and loss by it can be also reduced.

Besides, distance between the antenna and the large metallic plate 12 can be further increased by the above-mentioned effect by further providing the second metallic plate 7 via the second spacer 6 made of resin as shown in FIG. 4 even if the antenna is installed over the large metallic plate 12, a magnetic flux 11" that passes the metallic plate 12 is a part in which magnetic flux density is further non-dense, and the disconnection of the magnetic flux hardly has an effect upon the impedance of the antenna.

Therefore, a stable characteristic is acquired by matching the impedance of the loop antenna 1 and the input/output impedance of the noncontact IC card reading/writing circuit 5 in a state in which the loop antenna 1, the magnetic body 2, the first spacer 3, the first metallic plate 4, the second spacer 6 and the second metallic flat plate 7 are piled independent of whether the large metallic plate exists in an installation location of the antenna or not, and the noncontact IC card reader/writer integrated with the antenna that greatly reduces the effect of metal and others around the installation location and meets a stable reading/writing characteristic can be provided.

(Second Embodiment)

Next, another embodiment of the noncontact IC card reader/writer integrated with the antenna according to the invention will be described.

Figure 5:
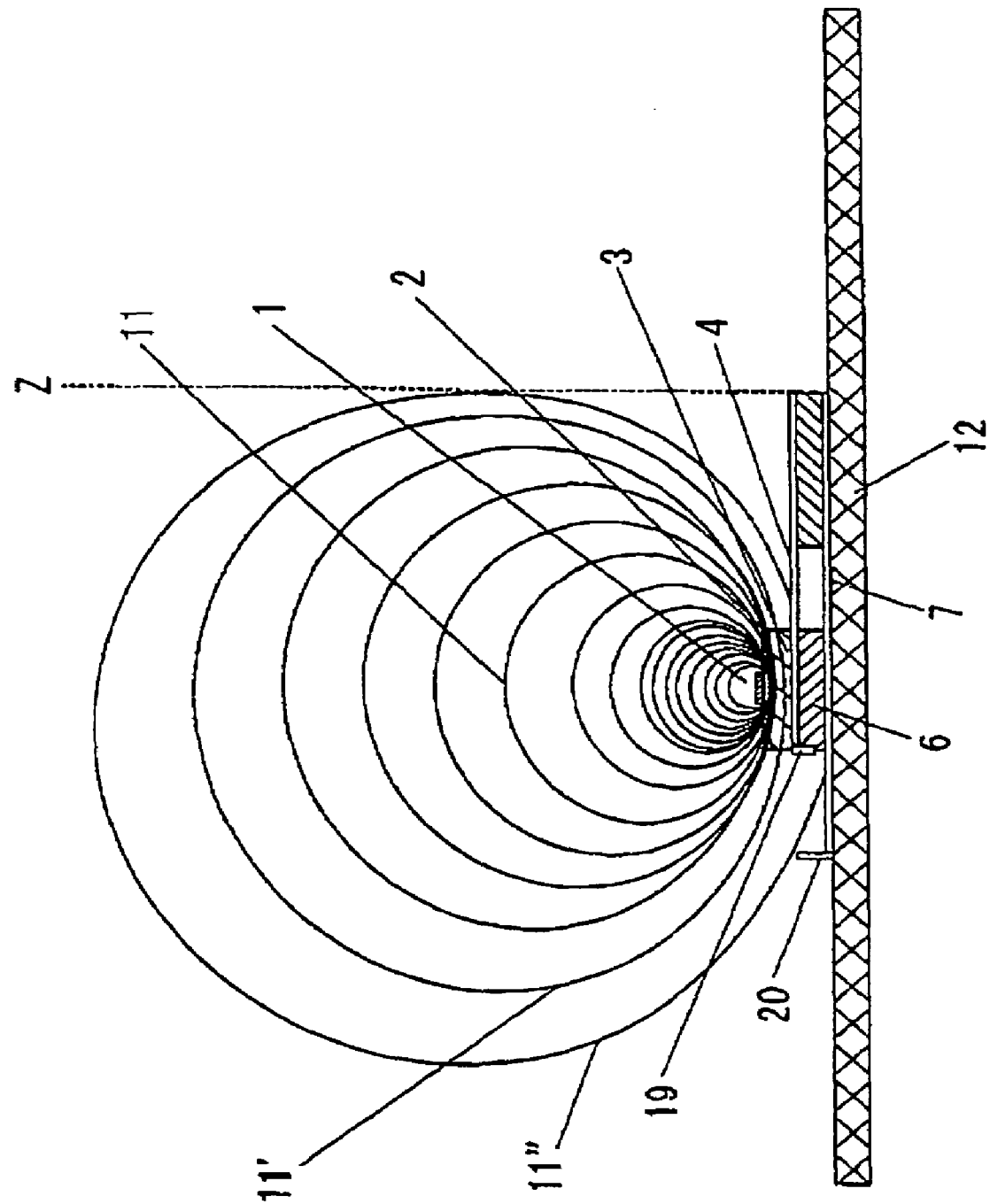
FIG. 5 is an operational explanatory drawing showing the flow of a magnetic flux of a noncontact IC card reader/writer integrated with an antenna equivalent to a second embodiment of the invention.
Figure 6:
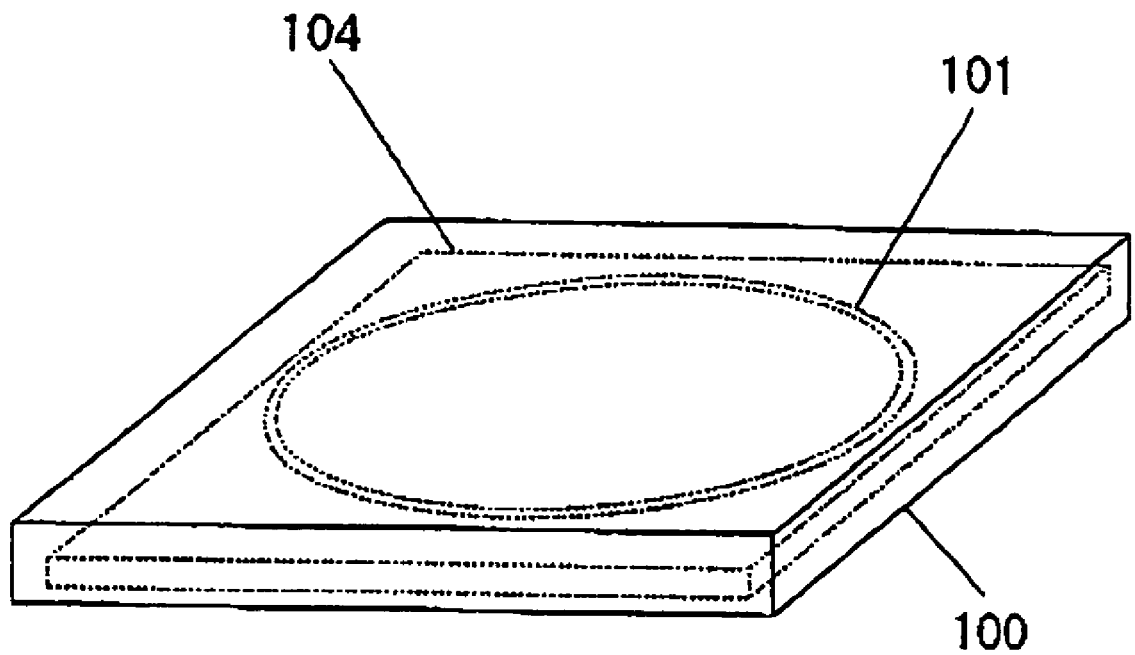
FIG. 6 is a conceptual drawing showing a conventional type noncontact IC card reader/writer.

FIG. 5 is an operational explanatory drawing showing the flow of a magnetic flux of a noncontact IC card reader/writer integrated with an antenna equivalent to a second embodiment of the invention and explains the operation in case the noncontact IC card reader/writer integrated with the antenna is installed on a large metallic plate 12. In FIG. 5, as in FIG. 4, a halt on the right side of a center line Z of the noncontact IC card reader/writer integrated with the antenna is omitted because the half is symmetrical based upon the center line. In FIG. 5, reference numbers 19 and 20 denote a side wall.

Mechanical strength is increased by providing the side wall 19 around the periphery of a first metallic plate 4 by press working and others and further providing the side wall 20 around the periphery of a second metallic plate 7 by press working and others as shown in FIG. 5, the disconnection of a magnetic flux is not increased by adding the side walls (because a magnetic flux 11" in FIG. 5 is already disconnected by a horizontal part shown in FIG. 5 of the first metallic plate 4 independent of whether the side wall 19 exists or not), the antenna is not influenced, and conversely, shielding effect for shielding a noncontact IC card reading/writing circuit 5 mounted on a printed board is increased.

The surface area of the second metallic plate 7 is increased by providing the side wall 20 around the periphery of the second metallic plate 7, is equivalent to that of a case that a larger metallic plate is arranged, and there is effect that influence in the case of installation on the large metallic plate 12 can be more reduced by matching the antenna in this state.

As described above, according to the invention, the small-sized noncontact IC card reader/writer integrated with the antenna that reduces the effect of metal and others around the installation location, meets the stable reading/writing characteristic and is convenient when the reader/writer is installed can be provided.

What is claimed is:

1. A noncontact recording medium reader/writer, comprising:
    an antenna, which supplies electric power and sends data to a recording medium by electromagnetic induction and acquires receive data from the recording medium by load fluctuation;
    a magnetic body, arranged at the back of the antenna and forming a magnetic circuit;
    a first metallic plate, arranged on the back side of the magnetic body; and
    a second metallic plate, arranged on the back side of the first metallic plate and larger than the first metallic plate in size,
    wherein the magnetic body and the first metallic plate are spaced apart from one another.

2. The noncontact recording medium reader/writer according to claim 1, wherein the magnetic body is formed in a loop shape.

3. The noncontact recording medium reader/writer according to claim 2, wherein: the width W2 of the magnetic body is substantially equal to or equivalent to the double or 3 to 5 times of the diameter or the width W1 of the antenna.

4. The noncontact recording medium reader/writer according to claim 1, wherein: the outside diameter of the magnetic body and the outside dimension of the first metallic plate are substantially equalized.

5. The noncontact recording medium reader/writer according to claim 1, wherein: the size of the second metallic plate is equal to or exceeds at least 1.1 times of the size of the first metallic plate.

6. The noncontact recording medium reader/writer according to claim 1, wherein: a first spacer made of insulating material is provided in a space between the magnetic body and the first metallic plate.

7. The noncontact recording medium reader/writer according to claim 6, wherein: the first spacer is arranged in the shape of a loop.

8. The noncontact recording medium reader/writer according to claim 6, wherein: the first spacer is made of resin.

9. The noncontact recording medium reader/writer according to claim 1, wherein: a second spacer made of insulating material is provided between the first metallic plate and the second metallic plate.

10. The noncontact recording medium reader/writer according to claim 9, wherein: the second spacer is arranged in the shape of a loop.

11. The noncontact recording medium reader/writer according to claim 9, wherein: the second spacer is made of resin.

12. The noncontact recording medium reader/writer according to claim 1, wherein: the second spacer made of insulating material is provided between the first metallic plate and the second metallic plate; and a noncontact IC card reading/writing circuit is housed in a spatial part inside the second spacer.

13. The noncontact recording medium reader/writer according to claim 1, wherein: a side wall planted on the back side is provided to the periphery of the first metallic plate.

14. The noncontact recording medium reader/writer according to claims 1, wherein: a side wall planted on the front side is provided to the periphery of the second metallic plate.

15. The noncontact recording medium reader/writer according to claims 1, wherein: the antenna, the magnetic body, the first metallic plate and the second metallic plate are arranged in a case composed of a first case made of resin and a second case made of resin.

16. The noncontact recording medium reader/writer according to claim 15, wherein: a first convex portion is provided inside a side wall of the first case made of resin; a concave sealing member that wraps the convex portion is provided; a second convex portion is provided between the side wall and the first convex portion; and waterproof structure is acquired by inserting a screw into a fitting part provided to the second convex portion via a hole provided outside the first convex portion and screwing on the second metallic plate.

17. The noncontact recording medium reader/writer according to claim 12, wherein: the antenna and the recording medium reading/writing circuit are electrically connected via an opening formed through the first metallic plate.

18. The noncontact recording medium reader/writer according to claim 17, wherein: metallic wire or a metallic plate is used for the connection.

19. A reader/writer apparatus communicating with noncontact recording medium, the reader/writer apparatus comprising:
    a loop antenna, which supplies electric power and sends information to the noncontact recording medium by electromagnetic induction and acquires receive information from the noncontact recording medium by load fluctuation;
    a magnetic body which is coupled to the loop antenna and forms a magnetic circuit;
    a communication circuit which transmits information to and receives information from the loop antenna through the magnetic body;
    a first metallic plate arranged between the magnetic body and the communication circuit; and
    a second metallic plate, the communication circuit being disposed between the first metallic plate and the second metallic plate,
    wherein the magnetic body and the first metallic plate are spaced apart from one another.

20. The reader/writer apparatus according to claim 19, wherein the second metallic plate is larger than the first metallic plate in size.

21. The reader/writer apparatus according to claim 19, wherein the loop antenna, the magnetic body, the first metallic plate, the communication circuit and the second metallic plate are disposed in an order comprising: the loop antenna, the magnetic body, the first metallic plate, the communication circuit and the second metallic plate.

22. The noncontact recording medium reader/writer according to claim 19, wherein: a first spacer made of insulating material is provided in a space between the magnetic body and the first metallic plate.

23. The noncontact recording medium reader/writer according to claim 22, wherein: the first spacer is arranged in the shape of a loop.

24. The noncontact recording medium reader/writer according to claim 22, wherein: the first spacer is made of resin.

25. The noncontact recording medium reader/writer according to claim 1, wherein: a side wall is provided around the periphery of the first metallic plate.

26. The noncontact recording medium reader/writer according to claim 1, wherein: a side wall is provided around the periphery of the second metallic plate.

27. The noncontact recording medium reader/writer according to claim 19, wherein: a side wall is provided around the periphery of the first metallic plate.

28. The noncontact recording medium reader/writer according to claim 19, wherein: a side wall is provided around the periphery of the second metallic plate.

* * * * *